(12) United States Patent
Fodor et al.

(10) Patent No.: US 7,577,510 B2
(45) Date of Patent: Aug. 18, 2009

(54) METHOD FOR SUPPRESSING DRIVELINE SHUDDER IN A VEHICLE WITH A TRACTION CONTROL SYSTEM

(75) Inventors: Michael Fodor, Dearborn, MI (US); Mitchell McConnell, Ypsilanti, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 592 days.

(21) Appl. No.: 11/161,326

(22) Filed: Jul. 29, 2005

(65) Prior Publication Data

US 2007/0027606 A1    Feb. 1, 2007

(51) Int. Cl.
  B60K 6/04  (2006.01)
  B60T 7/12  (2006.01)
  G06F 17/00 (2006.01)
(52) U.S. Cl. .......................... 701/82; 701/80; 701/84; 180/197
(58) Field of Classification Search .................. 701/82, 701/38, 81, 71, 79, 80, 84, 90; 180/197
  See application file for complete search history.

(56) References Cited

U.S. PATENT DOCUMENTS

| 5,067,579 | A | * | 11/1991 | Kushi et al. ................. 180/197 |
|---|---|---|---|---|
| 5,163,530 | A | | 11/1992 | Nakamura et al. |
| 5,193,889 | A | | 3/1993 | Schaefer et al. |
| 5,469,359 | A | | 11/1995 | Tsuyama et al. |
| 5,644,488 | A | * | 7/1997 | Ito et al. ......................... 701/1 |
| 5,952,564 | A | | 9/1999 | Naito et al. |
| 5,957,991 | A | | 9/1999 | Yasuda |
| 6,050,652 | A | | 4/2000 | Koibe et al. |
| 6,128,568 | A | | 10/2000 | Sasaki |
| 6,401,853 | B1 | | 6/2002 | Turski et al. |
| 7,024,290 | B2 | * | 4/2006 | Zhao et al. .................... 701/22 |
| 7,047,121 | B2 | * | 5/2006 | Inoue et al. ................... 701/81 |
| 2004/0098188 | A1 | | 5/2004 | Priemer et al. |

\* cited by examiner

*Primary Examiner*—Tan Q Nguyen
(74) *Attorney, Agent, or Firm*—O'Brien Jones, PLLC

(57) ABSTRACT

A method and system of controlling a vehicle 10 having a control system and a driveline comprises detecting driveline shudder and modifying the traction control system output in response to detecting driveline shudder to reduce the driveline shudder. The driveline shudder may be detected in various ways including determining the average driven wheel acceleration signal. Methods for controlling driveline shudder include changing the target slip and changing the engine output torque.

13 Claims, 4 Drawing Sheets

METHOD FOR SUPPRESSING DRIVELINE SHUDDER IN A VEHICLE WITH A TRACTION CONTROL SYSTEM

TECHNICAL FIELD

The present invention relates generally to a traction control system, and more particularly, to a control system that reduces driveline shudder during the operation of a traction control system.

BACKGROUND

Traction control systems generally use engine intervention or a combination of braking and engine intervention to reduce wheel slip at the driven wheels of the vehicle. It has been found that various vehicles exhibit driveline shudder during traction control events, especially on very low coefficient of friction surfaces. The shudder appears to be invoked by engine pulsations that occur when operating the vehicle at reduced torque using cylinder deactivation during traction control events. The frequency of the vibration corresponds to the expected natural frequency of the engine mass and tire masses connected together by the half shafts. Engine oscillations are hard to detect and thus the damping source comes from the road surface itself.

It is therefore desirable to reduce driveline shudder in a vehicle by controlling the operation of the engine so that the road surface may reduce the driveline shudder.

SUMMARY

A method of controlling a vehicle having a control system and a driveline comprises detecting driveline shudder and modifying the traction control system output in response to detecting driveline shudder to reduce the driveline shudder. Various methods may be used to detect driveline shudder including detecting driveline shudder in response to the average wheel acceleration.

In another aspect of the invention, two methods for reducing driveline shudder may be present. After driveline shudder is detected one of two different methods for reducing driveline shudder may be chosen in response to the coefficient of friction of the road surface. The coefficient of friction may be determined according to the normal forces or dynamic normal forces acting on the vehicle.

One advantage of the two method determination is that the vehicle may take advantage of the available longitudinal acceleration. Thus, drivability of the vehicle is improved.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
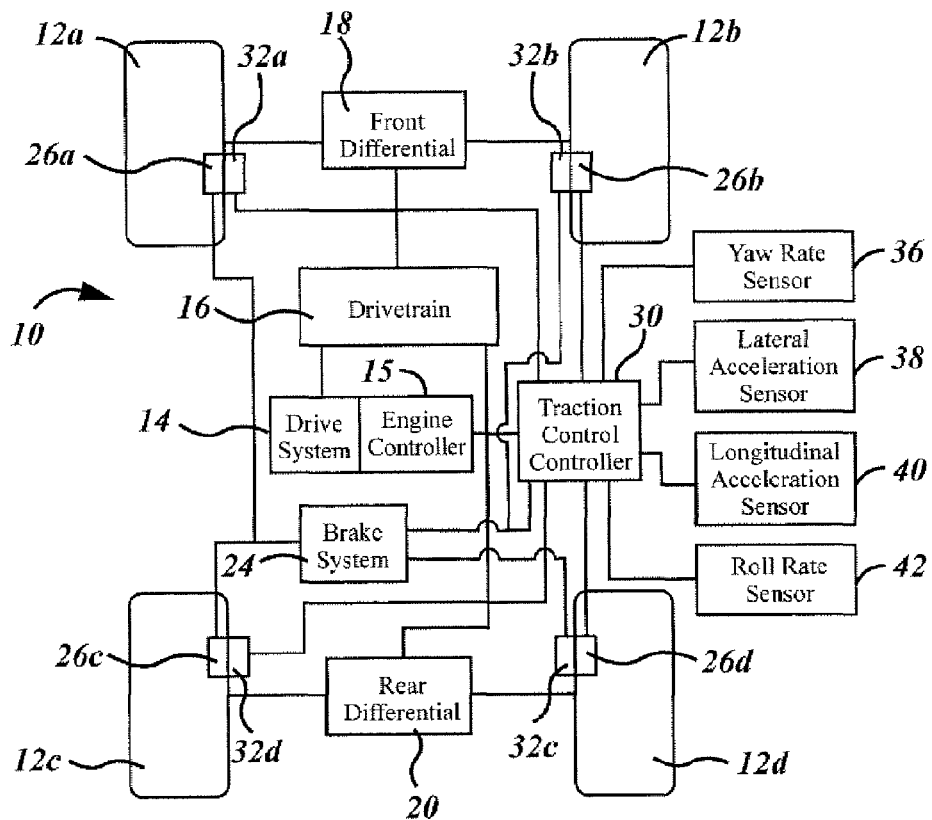
FIG. 1 is a block diagrammatic view of a vehicle having a traction control system according to the present invention.

The following figures describe a traction control system that may be used for an engine only traction control system. However, the teachings of the present invention may also be applicable to engine and brake-type traction control systems. Also, the following description is set forth with respect to side to side (lateral) loading shift. The teaching may also be applied to longitudinal loading shift.

An automotive vehicle 10 is illustrated having wheel and tire assemblies 12a, 12b, 12c, and 12d. A drive system 14 coupled to a drivetrain 16 provides power to the wheel and tire assemblies 12 through the front differential 18 and rear differential 20. The drive system 14 may include an engine controller 15 that is microprocessor-based. The engine controller 15 may be used to control the amount of torque and thus the amount of slip generated at each of the wheels. The drive system 14 may vary the amount of engine power to effect a change in torque at the wheel and tire assemblies 12. A reduction in the amount of fuel and changing other parameters may reduce the amount of power output from the engine. It should also be noted that the drive system may include an internal combustion-only type system, a hybrid system, an electric drive system, or a fuel cell system.

The drive system 14 provides torque through the drivetrain 16 which may include a transmission, front differential 18 and rear differential 20. In a rear wheel drive vehicle, only the rear differential 20 would be present. A four or all-wheel drive system may include both the front differential 18 and the rear differential 20. Also, in certain all-wheel drive systems an additional center differential may be provided.

A brake system 24 that may include electric, electro-hydraulic, or hydraulic systems is used to actuate the brakes 26a, 26b, 26c, and 26d. The brakes are activated in response to driver input. The brake system 24 may also be activated in response to a traction control system that includes a traction control controller 30.

The traction control system and thus the controller 30 may be coupled directly or indirectly to wheel speed sensors 32a, 32b, 32c, and 32d. As illustrated, the wheel speed sensors are coupled directly to the wheels. The wheel speed sensors may be the output from an anti-lock brake system, an axle sensor or the like.

It should be noted that the wheels driven by the drive system 14 are referred to as driven wheels whereas wheels that are not coupled to the engine are referred to as undriven wheels. In the following description the speed of the undriven wheels may be used as the reference speed. In four-wheel or all-wheel drive systems no wheels are undriven and thus various algorithms may be used to determine the reference speed. The reference speed may correspond to a vehicle speed. Wheels that are touching the road surface and have a torque level below a certain torque threshold may be included in such algorithms.

The traction controller 30 is coupled to the drive system 14. The traction controller 30 may generate a control signal or torque command to reduce the amount of torque to the engine upon the sensing of a slipping wheel.

Various dynamic sensors may be coupled to the traction controller 30. Dynamic sensors may include a yaw rate sensor 36, a lateral acceleration sensor 38, and a longitudinal acceleration sensor 40. The yaw rate sensor 36 generates a yaw rate signal corresponding to the yaw rate of the vehicle. From the yaw rate sensor 36 the yaw acceleration may also be determined. The lateral acceleration sensor generates a lateral acceleration signal corresponding to the lateral acceleration of the vehicle body. The longitudinal acceleration sensor 40 generates a longitudinal acceleration signal corresponding to the longitudinal acceleration of the vehicle. The various sensors may be directly coupled to the traction controller 30 or may be coupled to various vehicle dynamic control systems such as a yaw control system or a rollover stability control system. A roll rate sensor 42 may also be used to determine load transfer for the vehicle.

Figure 2A:
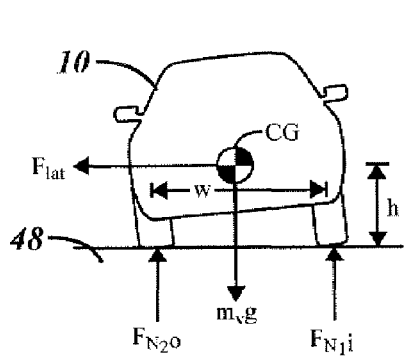
FIGS. 2A and 2B are diagrammatic views of forces acting on the vehicle.
Figure 2B:
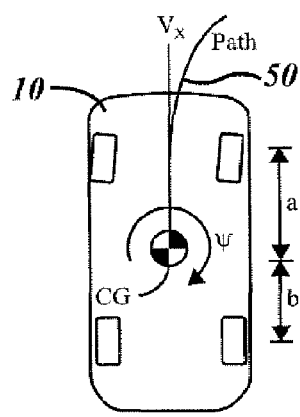

Referring now to FIGS. 2A and 2B, automotive vehicle 10 with various variables associated therewith is illustrated. The vehicle 10 is disposed on road surface 48 and has a center of gravity CG. A lateral force $F_{lat}$ is shown acting laterally on the center of gravity of the vehicle. The track width of the vehicle is set forth by w. The height of the center of gravity of the vehicle is h. The weight of the vehicle is the $m_v g$. The normal forces acting on the tires are $F_n$. In FIG. 2A, only two normal forces are illustrated. Each of the wheels/tire assemblies have a separate normal force. As is best shown in FIG. 2B, the vehicle is turning right as indicated by the path 50. The vehicle velocity is in the direction $V_x$. The distance between the front wheel axle and the center of gravity is given by a. The distance between the center of gravity and the rear axle is given by b. The yaw rate $\Psi$ or yaw acceleration $\dot{\Psi}$ is shown around the center of gravity of the vehicle. As is best seen in FIG. 2A, when the vehicle turns right, load transfers to the outside wheels.

Described below are methods for estimating tire normal forces relevant to traction control system performance and accounting for normal force changes in the control system.

Figure 3A:
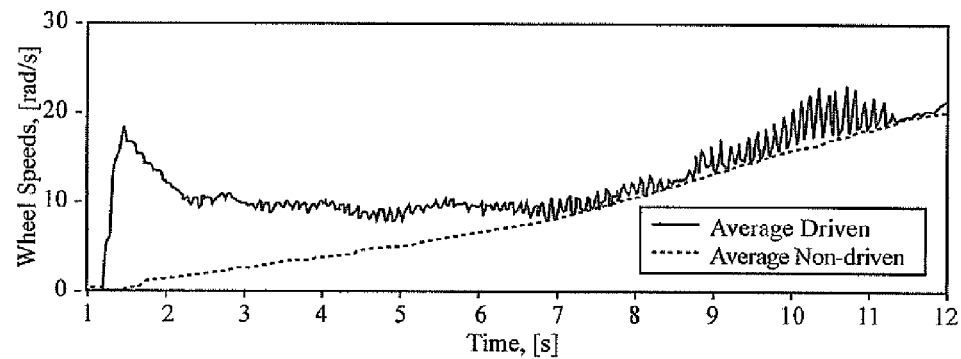
FIGS. 3A through 3C illustrate wheel speed average absolute slip and average acceleration of the vehicle during a shudder event.
Figure 3B:
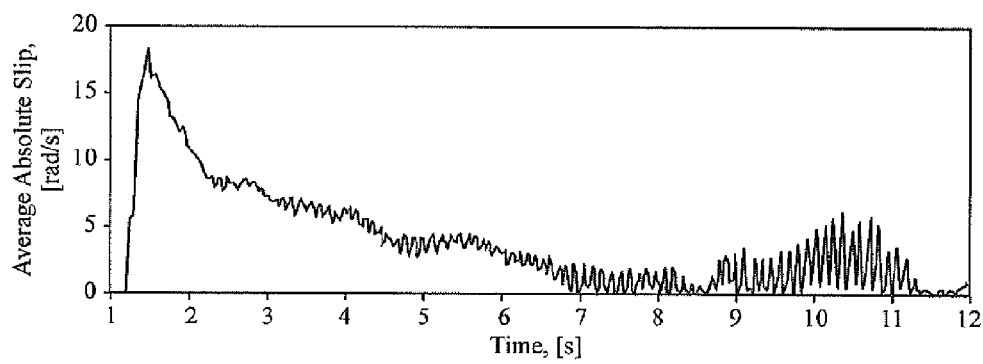
Figure 3C:
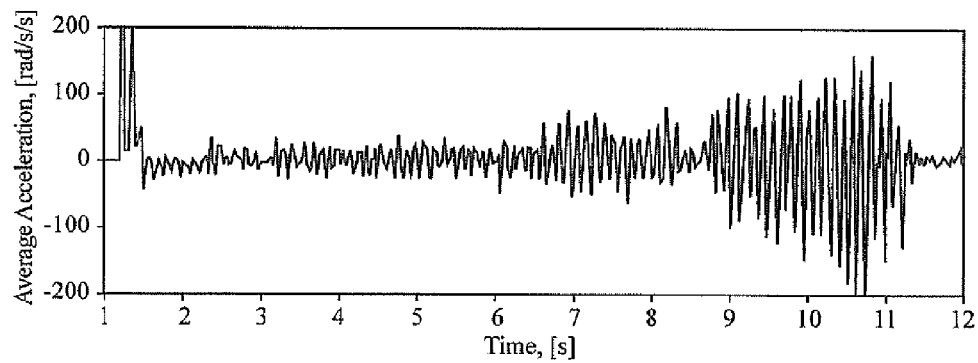

FIG. 3A-3C show a wide-open throttle traction control run during which the shudder occurs. Initially the average driven wheel speed is held nearly constant by the TC system due to a minimum engine speed constraint. As the vehicle speed increases (as indicated by the average non-driven wheel speed), absolute tire slip falls and the vibration seen in the average wheel speed trace increases in amplitude. Once absolute slip enters the 1 to 4 rad/s range, the shudder amplitude begins to increase and grows more rapidly around t=9 sec.

Figure 4A:
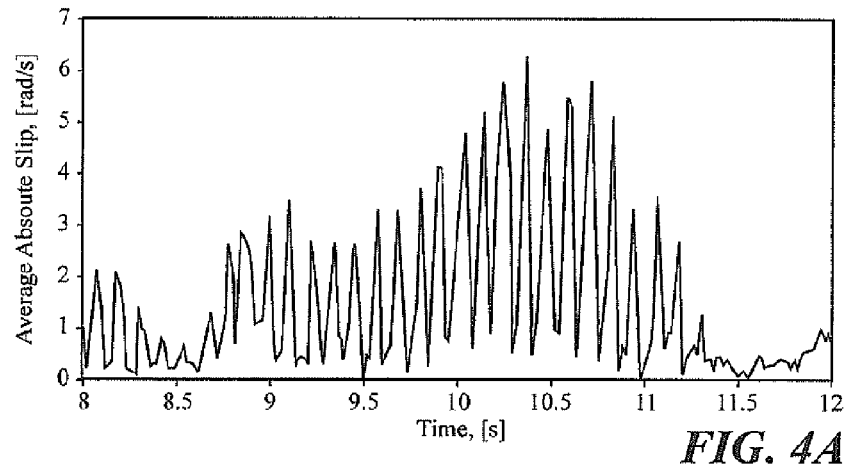
FIGS. 4A and 4B are close-ups of FIGS. 3B and 3C, respectively, which illustrate average absolute slip and average acceleration.
Figure 4B:
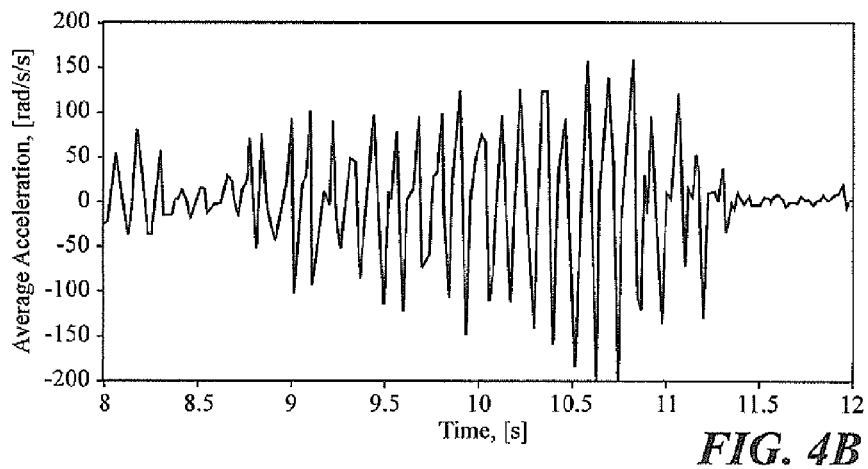

FIGS. 4A and 4B show the same event with a close-up of FIGS. 3B and 3C, respectively, in the t=8 to 12 sec range.

The present invention targets tire slip where it provides the best vehicle dynamic performance, detects the shudder phenomenon when it occurs and drops wheel slip to force the wheel into the positive slope region of the slip/torque relationship for the tire, using this relationship as a natural damper for the vibrating mode. Dropping the slip can either be accomplished by reducing the target slip to the traction controller's closed-loop compensator or by quickly dropping the traction control engine torque command in an open-loop manner. Experimentation demonstrated that both methods are effective in eliminating the shudder with the former technique providing the best vehicle longitudinal acceleration performance and the later providing the fastest elimination of the vibration.

Figure 5:
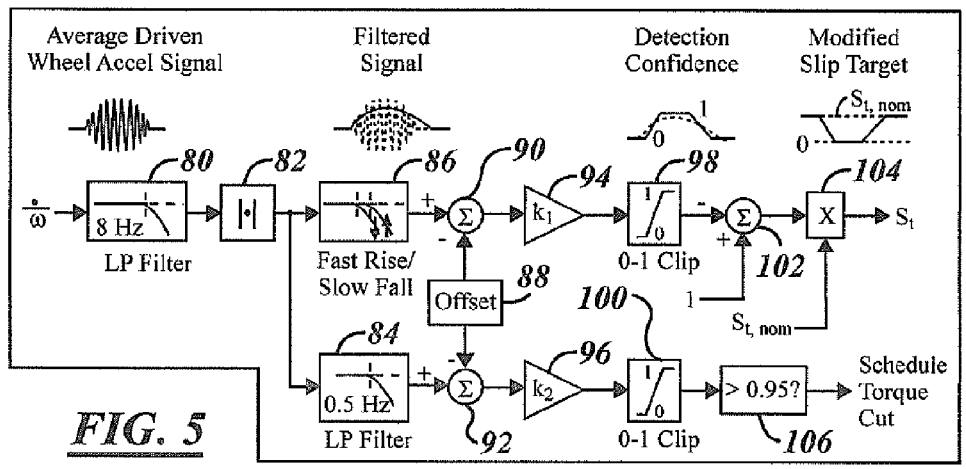
FIG. 5 is a block diagrammatic control system formed according to the present invention.

To instantiate the above-described methods, an algorithm was constructed as is diagrammed in FIG. 5. The average driven wheel acceleration signal is initially filtered with a first-order low-pass filter tuned at 8 Hz to remove high-frequency content that is unneeded for detecting the shudder in block 80. In block 82 the absolute value of this filtered signal is then fed to two separate branches, one for slip target modification (Top) and one for open-loop torque cutting (Bottom). Each of these branches processes the absolute filtered signal using another low-pass filter. For the open-loop torque-cut branch this filter is simply tuned to ½ Hz in block 84. For the target-modifying branch, the filter is a lopsided fast-rise/slow-fall first order low-pass filter tuned at ½ Hz in block 86 for increasing values of the driving signal and 0.15 Hz for decreasing values. This provides a resulting signal that rises quickly when the shudder begins but bleeds off more slowly. The intent is to find a slip target that produces a reasonable tradeoff (tunable) between shudder and vehicle performance. Accompanying the block diagram are several traces showing the evolution of the signal as it moves through the target-modifying portion of the algorithm (the lower branch for torque cutting produces similar signals).

After the low-pass filter stages of the two algorithm branches, an offset in block 88—equal for both branches—is subtracted from the filtered signals using respective summers 90 and 92. This offset represents the acceleration level below which a shudder event is considered inconsequential. The resulting signal is multiplied by a tunable gain in blocks 94 and 96 and clipped in blocks 98 and 100 between zero and one. These clipped values represent the degree of confidence that a shudder event is occurring, and the tunable gains set the sensitivities of these confidences. A confidence value of one indicates a fully formed shudder event, while a value of zero indicates no shudder. For the target-modifying branch, the complement (1−confidence) of this confidence is calculated in block 102 and then multiplied by the nominal slip target $s_{t,nom}$ in block 104 to produce a modified slip target that drops to zero when the confidence for this branch is unity. For the open-loop torque cut branch, a torque cut is scheduled to occur when the confidence for this branch exceeds 0.95 as indicated in decision block 106. A timer is then used to guarantee that these torque drops do not occur more frequently than some tunable time value (nominally 3 seconds).

FIGS. 6A-6D illustrate the algorithm at work. Shown are the absolute wheel slip in 6A, target and torque-cut confidences in 6B, wheel slip target in 6C, and traction control desired wheel torque in 6D. In this example, the nominal slip target was set to 2 rad/s. As shudder occurs, the confidence values rise and the slip target is reduced. Between t=12 and 13 sec, the confidences rise to unity, resulting in a slip target of zero and an associated open-loop torque cut. As a result, the overall duration of the shudder event is reduced to about 1 second.

A C-code version of the algorithm is listed as follows:

```
    driven_accel_detect=fof(driven_accel_detect,
avg_driven_accel,dt, 8.0);
    if(first_spin==1||tc_state<2)driven_accel_detect=0.0;
    if(fabs(driven_accel_detect)>detect_sig)detect_sig=
fof(detect_sig, fabs(driven_accel_detect), dt, 0.5);
    else detect_sig=fof(detect_sig,fabs(driven_accel
_detect),dt, 0.15);
    detect_sig2=fof(detect_sig2,fabs(driven_accel_detect), dt, 0.5);
    detect_conf=clip(0.0, detect_mult*0.1*(detect_sig-5.0), 1.0);
    detect_conf2=clip(0.0, detect_mult2*0.1*(detect_sig2-5.0), 1.0);
    if(detect_timer>-0.5) detect_timer=detect_timer+dt;
    if(detect_conf2>0.95&&detect_timer<-0.5)detect_timer
=0.0;
    if(detect_timer>3.0)detect_timer=-1.0;
    if(tc_state<2)detect_timer=-1.0; /* Reset timer if TC is off */
```

-continued

```
target_slip=target_slip_nominal*(1.0−detect_conf);
Here the function fof(current_state, input, timestep, frequency)
    provides a first-order
filter.
```

In practice, it must be determined which branch to take. That is, it must be determined whether the modified slip target branch or the scheduled torque cut branch should be used. Choosing the branch will depend upon the individual vehicle. That is, each vehicle will be tested and determined for various conditions which branch is desirable to remedy the shudder. In one constructed embodiment, the determination of which branch was chosen based upon the coefficient of friction of the road surface or mu. The coefficient of friction may be determined by dividing the normal force acting on the wheel which may be the normal dynamic force divided by the torque to spin the tire, multiplied by the outer radius of the tire or the rolling radius. The dynamic normal force may be determined using a lateral acceleration sensor, a yaw rate sensor, differential speeds of the driven wheels, or the like $$F_{N,min} = \left(1 + \frac{\dot{V}_x h}{ga}\right)\left(1 - \frac{2V_x \dot{\psi} h}{gw}\right)\left(\frac{m_v ga}{2(a+b)}\right)$$

Figure 6A:
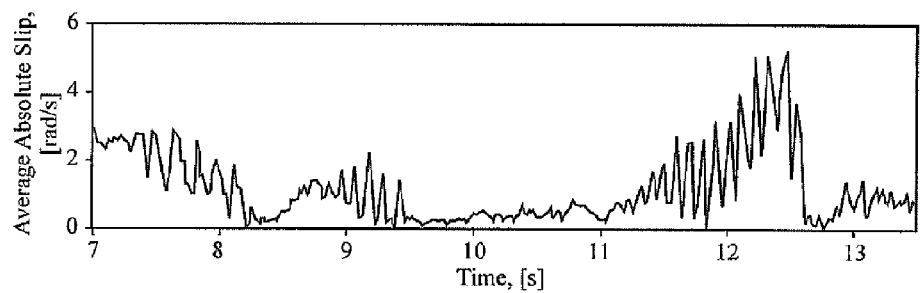
FIGS. 6A, 6B, 6C, and 6D are average wheel slip, confidence levels, slip target, and traction control torque commands determined in the method illustrated in FIG. 5, respectively.
Figure 6B:
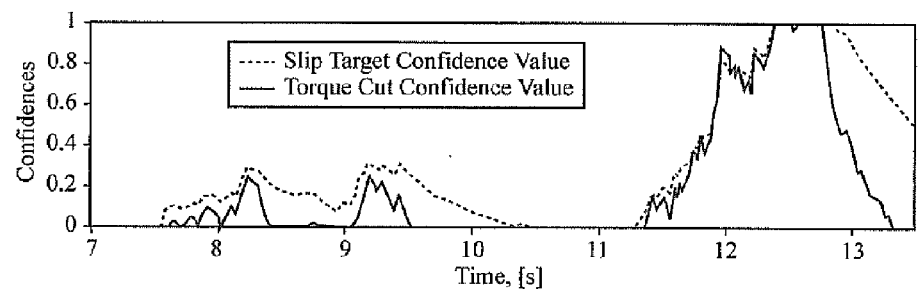
Figure 6C:
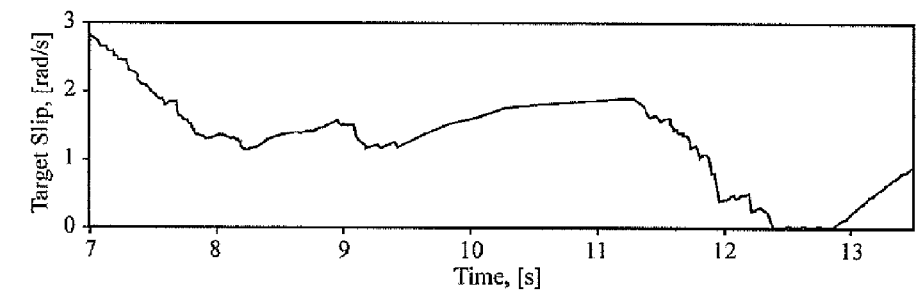
Figure 6D:
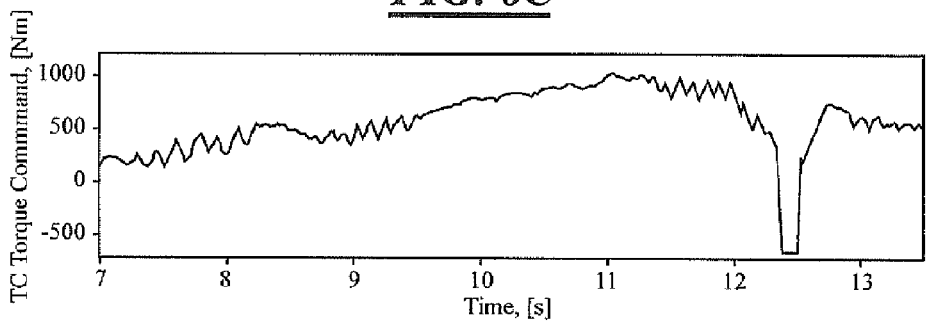

After the branch is chosen, either the modified slip target or the scheduled torque cut are used to ultimately control the engine and thus reduce the shudder in the vehicle. As can be best seen in FIG. 6D, the target slip as shown in FIG. 6C or the torque command in FIG. 6D are changed to reduce the shudder in the vehicle.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a vehicle with a traction control system that suppresses driveline shudder, the method comprising:
   receiving signals corresponding to driveline shudder; and
   selecting between a first method of modifying a traction control system based on reducing engine output torque and a second method of modifying a traction control system based on setting a modified slip target for torque,
   wherein selecting between the first method and the second method is based on a road surface coefficient of friction.

2. The method of claim 1, wherein the first method of modifying a traction control system comprises reducing engine output torque in an open-loop.

3. The method of claim 1, wherein receiving signals corresponding to driveline shudder comprises receiving an average wheel acceleration signal.

4. The method of claim 1, wherein receiving signals corresponding to driveline shudder comprises receiving a low-pass filtered average wheel acceleration signal.

5. The method of claim 1, wherein receiving signals corresponding to driveline shudder comprises receiving a band-pass filtered average wheel acceleration signal.

6. The method of claim 1, further comprising controlling an output of the traction control system based on a confidence level of driveline shudder.

7. A system for controlling a vehicle with a traction control system that suppresses driveline shudder, the system comprising:
   at least one wheel speed sensor; and
   at least one controller configured to receive signals from the at least one wheel speed sensor and select between a first method of modifying a traction control system, the first method being based on a reduction of engine output torque, and a second method of modifying a traction control system, the second method being based on a modified slip target for torque,
   wherein the at least one controller is configured to select between the first method and the second method based on a road surface coefficient of friction.

8. The system of claim 7, wherein the at least one controller is configured to select between the first method of modifying a traction control system and the second method of modifying a traction control system in response to a low-pass filtered average wheel acceleration signal.

9. The system of claim 7, wherein the at least one controller is configured to control an output of the traction control system based on a confidence level of driveline shudder.

10. A method for controlling a vehicle with a traction control system that suppresses driveline shudder, the method comprising:
    controlling a drive wheel of a vehicle based on a modified output of a traction control system, the modified output being modified based on a method of reducing engine output torque or a method of setting a modified slip target for torque,
    wherein a selection between the method of reducing engine output torque and the method of setting a modified slip target for torque is based on a road surface coefficient of friction.

11. The method of claim 10, wherein the method of reducing engine output torque comprises reducing engine output in an open-loop.

12. The method of claim 10, wherein the method of setting a modified slip target for torque comprises reducing the slip target to a closed-loop compensator of a traction controller.

13. the method of claim 10, further comprising adjusting the modified output based on a confidence level of driveline shudder.

* * * * *